UNITED STATES PATENT OFFICE.

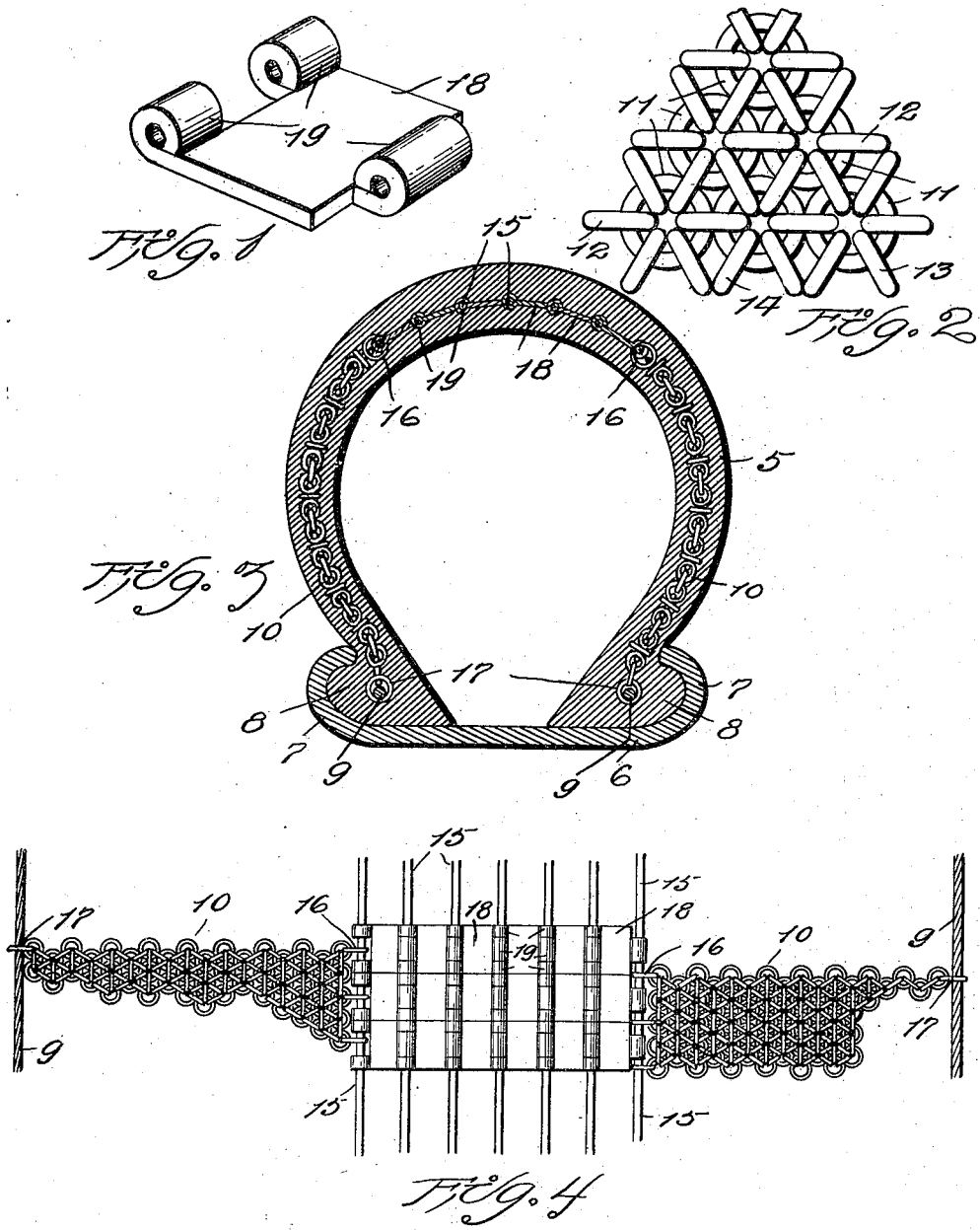

EDWARD J. TUREK, OF ST. LOUIS, MISSOURI.

PNEUMATIC TIRE.

1,425,812.  Specification of Letters Patent.  Patented Aug. 15, 1922.

Application filed October 11, 1919. Serial No. 330,050.

*To all whom it may concern:*

Be it known that I, EDWARD J. TUREK, a citizen of the United States, residing at the city of St. Louis and State of Missouri, have invented a new and useful Pneumatic Tire, of which the following is a specification.

My invention relates to improvements in pneumatic tires, and is especially directed to the prevention of punctures and blow-outs in the casings of the tires.

My primary object is to construct a concatenation, coextensive with the circumference of the tire; having its side margins secured throughout their lengths to serve, with the rim or tire mounting, as a complete envelope for the casing and its inflated element; and, whose tread portion, although a part of the concatenation is imperforate.

A more specific object of my improvements is to construct a casing, in whose beads there are continuous cores, such as cables, to which cores there is secured throughout their circumferences, the side margins of metalliform mesh strips or belts, whose outer margins are united relatively by a strip or belt of metalliform plates, relatively hinged upon continuous metalliform pintles or bonds, which pintles of themselves have the quality of bending or flexing circumferentially and upon which the plates may revolve so that the belt of metalliform plates may conform, without resistance, to the casing in its deflections, both circumferentially and sectionally as when in use, and which mesh and plate belts together with the rim, or tire mounting, constitute a protecting envelope for the casing which is highly flexible and both puncture and blow-out proof.

My improvements consist in the novel construction, arrangement and combination of parts as fully, clearly and concisely set forth hereinafter, definitely pointed out in my claim and illustrated by the accompanying drawing, in which, Fig. 1 is an enlarged perspective view of one of the plates of the belt for the tread portion of the casing.

Fig. 2 is an enlarged plan view of a fragment of one of the belts for the sides of the casing.

Fig. 3 is a transverse sectional elevation of a casing, embodying, and constructed in accordance with, my invention, mounted upon a rim, and Fig. 4 is a plan view, showing fragments of the tread and side belts and the several cables and pintles.

Referring by numerals to the drawing, 5 designates the casing and 6 the rim, or tire mounting, the latter having the "clincher" flanges 7, and the former having the beads 8 which are retained in said flanges.

Secured preferably as shown by being embedded as cores in the bead portions of the casing are the cables, or continuous bonds, 9, and secured to each of the cables, coextensive with their lengths, which lengths are the circumference of the casing, is a belt or strip 10, of metalliform mesh fabric, as shown in Fig. 2, in which there are the links 11, which lie in the plane of the sectional tread of the fabric and which constitute the body thereof; the links 12 which occupy planes substantially at right angles to the planes of the links 11, and which couple or unite the links 11 in rows extending lengthwise of the fabric, or circumferentially of the casing, and the links 13 and 14 which are relatively angularly disposed and which unite or couple the rows of the links 11.

This form of the metalliform fabric may be readily formed of "open" links, which after joining, may be welded, or otherwise have their open ends secured, to form substantially continuous links, and this peculiar "weave" while being highly flexible as required for use in the sides of the casing is closely woven as to present a body substantially impenetrable by common puncture producing objects, and which by reason of the close weave forms a body through which the material of the casing may not pass through so that "blow-outs" are not possible.

The numerals 15 designate bonds or pintles, which are continuous and extend circumferentially of the casing, at its tread portion, the two outermost bonds being extended through the marginal links 16 of the fabrics 10, in the same manner as the end margins of the fabrics 10 are secured to the cables 9, as by the links 17. The several bonds 15 are relatively laterally joined by a plurality of plates, such as 18 which are abutted at both their side and end margins and at each side margin, of each plate, provided with an integral eye or pintle-bearing 19 which surrounds and hinges upon the bonds 15.

By such construction I provide an armor, for pneumatic tires, which is highly flexible throughout, so that there will be little or no added resistance to the deflections of the tire, and which armor will prevent puncturing of the inflated element and its "blowing out" through the casing.

I claim:

A puncture and blow-out preventing means for pneumatic tires comprising a plurality of flexible, circumferentially continuous bonds, a strip comprising a plurality of metalliform plates, each of which is provided with integral eyes, forming hinges, through which certain of said continuous, flexible bonds are extended and which plates have their contiguous margins abutted to form an imperforate envelope for a portion of the tire sectionally and a strip of metalliform mesh fabric carried by said bonds at each side of the said plates.

EDWARD J. TUREK.